US009592799B2

(12) United States Patent
Iyatani (10) Patent No.: US 9,592,799 B2
(45) Date of Patent: Mar. 14, 2017

(54) ELECTRONIC CONTROL UNIT AND VEHICLE BRAKE HYDRAULIC PRESSURE CONTROL UNIT

(71) Applicant: NISSIN KOGYO CO., LTD., Ueda, Nagano (JP)

(72) Inventor: Masatoshi Iyatani, Nagano (JP)

(73) Assignee: AUTOLIV NISSIN BRAKE SYSTEMS JAPAN CO., LTD., Nagano (JP)

(*) Notice: Subject to any disclaimer, the term of this patent is extended or adjusted under 35 U.S.C. 154(b) by 23 days.

(21) Appl. No.: 14/541,958

(22) Filed: Nov. 14, 2014

(65) Prior Publication Data
US 2015/0137589 A1 May 21, 2015

(30) Foreign Application Priority Data
Nov. 18, 2013 (JP) ................... 2013-237526

(51) Int. Cl.
*B60T 8/36* (2006.01)
*B60T 8/17* (2006.01)
(Continued)

(52) U.S. Cl.
CPC ............ *B60T 8/17* (2013.01); *B60R 16/0239* (2013.01); *B60T 8/368* (2013.01); *B60T 8/3675* (2013.01);
(Continued)

(58) Field of Classification Search
CPC ........ B60T 8/17; B60T 8/3675; B60T 8/3685; B60T 13/66; Y10T 137/87885
See application file for complete search history.

(56) References Cited

U.S. PATENT DOCUMENTS 5,127,440 A * 7/1992 Maas ................ B60T 8/3675
137/560
5,921,639 A * 7/1999 Hosoya ............ B60T 8/3675
303/113.1
(Continued)

FOREIGN PATENT DOCUMENTS

EP 1588913 A1 10/2005
JP S45-018407 Y 7/1970
(Continued)

OTHER PUBLICATIONS

European Search Report for related EP Application No. 14193424.0-1756, dated May 26, 2015, 5 pages.
(Continued)

*Primary Examiner* — Thomas Irvin
(74) *Attorney, Agent, or Firm* — Andrew M. Calderon; Roberts Mlotkowski Safran Cole & Calderon, P.C.

(57) ABSTRACT

One embodiment provides an electronic control unit including: a base body; a control circuit board that controls electric parts; and a housing that is attached to one surface of the base body. The housing includes an accommodating portion which accommodates the control circuit board thereinside and a flange. The flange includes an attaching hole penetrating therethrough. A part of the accommodating portion is positioned on an extension of a center axis of the attaching hole. An attaching pin projects from the one surface of the base body so as to be inserted into the attaching hole. An attaching portion is formed on the attaching pin so as to be positioned between the flange and the accommodating portion. An elastic member is attached to the attaching portion so as to bias the flange toward the one surface of the base body.

20 Claims, 5 Drawing Sheets (51) Int. Cl.
*B60R 16/023* (2006.01)
*B60T 13/66* (2006.01)

(52) U.S. Cl.
CPC ............ *B60T 8/3685* (2013.01); *B60T 13/66* (2013.01); *Y10T 137/87885* (2015.04)

(56) References Cited

U.S. PATENT DOCUMENTS

| | | | | |
|---|---|---|---|---|
| 6,124,772 | A * | 9/2000 | Heise | B60R 16/0239 303/119.2 |
| 6,354,674 | B1 * | 3/2002 | Iwamoto | B60T 8/368 303/119.3 |
| 6,634,723 | B1 * | 10/2003 | Ganzel | B60T 8/368 303/119.3 |
| 7,334,848 | B2 * | 2/2008 | Segawa | B60T 8/368 137/884 |
| 8,220,878 | B2 * | 7/2012 | Yoshinaga | B60T 8/368 303/119.3 |
| 8,366,206 | B2 * | 2/2013 | Kodama | B60T 8/368 303/116.1 |
| 9,056,596 | B2 * | 6/2015 | Nagashima | B60T 7/042 |
| 2004/0012257 | A1 * | 1/2004 | Jocham | B60T 8/3675 303/119.2 |
| 2005/0231026 | A1 * | 10/2005 | Barberis | B60T 8/3235 303/7 |
| 2011/0062775 | A1 * | 3/2011 | Iyatani | B60T 8/368 303/20 |
| 2013/0033098 | A1 * | 2/2013 | Nagashima | B60T 7/042 303/199 |

FOREIGN PATENT DOCUMENTS

| | | |
|---|---|---|
| JP | H11-046072 A | 2/1999 |
| JP | H1143032 | 2/1999 |
| JP | H11-270528 A | 10/1999 |
| JP | 2004039948 | 2/2004 |
| JP | 2004-168281 A | 6/2004 |
| JP | 2005294480 | 10/2005 |
| JP | 2009006855 | 1/2009 |

OTHER PUBLICATIONS

Japanese Office Action dated Nov. 10, 2015 in related JP Application No. 2013-237526, 4 pages.

* cited by examiner

ELECTRONIC CONTROL UNIT AND VEHICLE BRAKE HYDRAULIC PRESSURE CONTROL UNIT

CROSS-REFERENCE TO RELATED APPLICATION(S)

This application claims priority from Japanese Patent Application No. 2013-237526 filed on Nov. 18, 2013, the entire contents of which are incorporated herein by reference.

FIELD

An embodiment described herein generally relates to an electronic control unit and a vehicle brake hydraulic pressure control unit.

BACKGROUND

A vehicle brake hydraulic pressure control unit that controls a brake hydraulic pressure for a wheel brake includes a base body in which brake fluid lines are formed, a control circuit board that controls electric parts and a housing having an accommodating portion which accommodates the control circuit board thereinside.

For example, a vehicle brake hydraulic pressure control unit may be configured such that a base body has screw holes, a flange of a housing has attaching holes penetrating therethrough, and screw members are inserted into the attaching holes and screwed into the screw holes to thereby fix the housing to the base body (for example, refer to JP-2005-294480-A).

Alternatively, a vehicle brake hydraulic pressure control unit may be configured such that a base body has screw holes, and a bottom portion of a housing has attaching holes penetrating therethrough, and screw members are inserted into the attaching holes from an inside of the housing and screwed into the screw holes, to thereby fix the housing to the base body (for example, refer to JP-2004-039948-A).

Still alternatively, a vehicle brake hydraulic pressure control unit may be configured such that a housing has screw holes, a base body has attaching holes penetrating therethrough, and screw members are inserted into the attaching holes and screwed into the screw holes, to thereby fix the housing to the base body (for example, refer to JP-2009-006855-A).

On the other hand, the area of the control circuit board to be used in the vehicle brake hydraulic pressure control units tends to increase, as the brakes are controlled in multiple ways.

In the configuration in which the screw members are inserted into the attaching holes in the flange, since the control circuit board is disposed within the area surrounded by the plural attaching holes, the size of the control circuit board may be limited.

In the configuration in which the attaching holes are formed in the bottom portion of the housing, the housing needs to be attached to the base body before the control circuit board is attached inside the housing. When the housing is removed from the base body, the control circuit board needs to be removed first. Consequently, the fabrication and maintenance of the vehicle brake hydraulic pressure control unit may become complicated and troublesome.

In the configuration in which the attaching holes penetrate the base body, the space for the attaching holes needs to be ensured in the interior of the base body so as to prevent the interference of the attaching holes with the brake fluid lines, and therefore, the base body may become large in size.

SUMMARY

One object of the present invention is to provide an electronic control unit and a vehicle brake hydraulic pressure control unit that can not only increase the capacity of an accommodating portion for accommodating a control circuit board but also facilitate the fabrication and maintenance thereof.

An aspect of the present invention provides an electronic control unit including: a base body; a control circuit board that controls electric parts; and a housing that is attached to one surface of the base body, wherein the housing includes an accommodating portion which accommodates the control circuit board thereinside and a flange, wherein the flange includes an attaching hole penetrating therethrough, wherein a part of the accommodating portion is positioned on an extension of a center axis of the attaching hole, wherein an attaching pin projects from the one surface of the base body so as to be inserted into the attaching hole, wherein an attaching portion is formed on the attaching pin so as to be positioned between the flange and the accommodating portion, and wherein an elastic member is attached to the attaching portion so as to bias the flange toward the one surface of the base body.

In this configuration, since the accommodating portion of the housing can be caused to project also in a position where the accommodating portion covers the attaching hole in the flange, the capacity of the accommodating portion can be increased.

Additionally, since the housing can be attached to or detached from the base body with the control circuit board attached within the housing, the fabrication and maintenance of the electronic control unit can be facilitated.

In addition, since no attaching hole is required to penetrate the base body, the base body can be reduced in size.

When the electronic control unit is applied to a vehicle brake hydraulic pressure control unit, a brake fluid line is formed in the base body, and a brake hydraulic pressure within the brake fluid line is controlled by the electric parts.

In this embodiment, since the capacity of the accommodating portion can be increased, even though the control circuit board becomes large as the brakes are controlled in multiple ways, the control circuit board can be accommodated in the housing.

Additionally, no through attaching hole needs to be provided in the base body, and therefore, the housing can be attached to the base body without affecting the brake fluid line in the base body.

In the electronic control unit, in the case of the elastic member being a bifurcating plate spring that holds the attaching portion of the attaching pin, the elastic member can be inserted between the flange and the accommodating portion from a side of the base body to attach the elastic member to the attaching pin.

Additionally, since the thickness of the elastic member is reduced, the space between the flange and the accommodating portion can be reduced, thereby reducing the housing in size in a height direction.

With the electronic control unit and the vehicle brake hydraulic pressure control unit of the invention, the base body can be reduced in size while increasing the space for accommodating the control circuit board. Additionally, the fabrication and maintenance of the electronic control unit and the vehicle brake hydraulic pressure control unit can be facilitated.

BRIEF DESCRIPTION OF DRAWINGS

FIGS. 1A and 1B show a vehicle brake hydraulic pressure control unit of an embodiment.

DETAILED DESCRIPTION

An embodiment will be described with reference to the drawings.

In the embodiment, There is exemplified the case The embodiment exemplifies the case in which an electronic control unit is applied to a vehicle brake hydraulic pressure control unit.

A vehicle brake hydraulic pressure control unit is used in a four-wheeled motor vehicle. The vehicle brake hydraulic pressure control unit controls brake hydraulic pressures to be imparted to wheel cylinders of wheel brakes, enabling the execution of such controls as anti-lock braking control, vehicle behavior stabilization control and the like.

The vehicle brake hydraulic pressure control unit can also be installed in a hybrid vehicle employing a motor in parallel as a power source, and an electric vehicle and a fuel cell vehicle and the like employing only a motor as a power source, in addition to a motor vehicle employing only an engine (an internal combustion engine) as a power source.

Figures 1A, 1B:
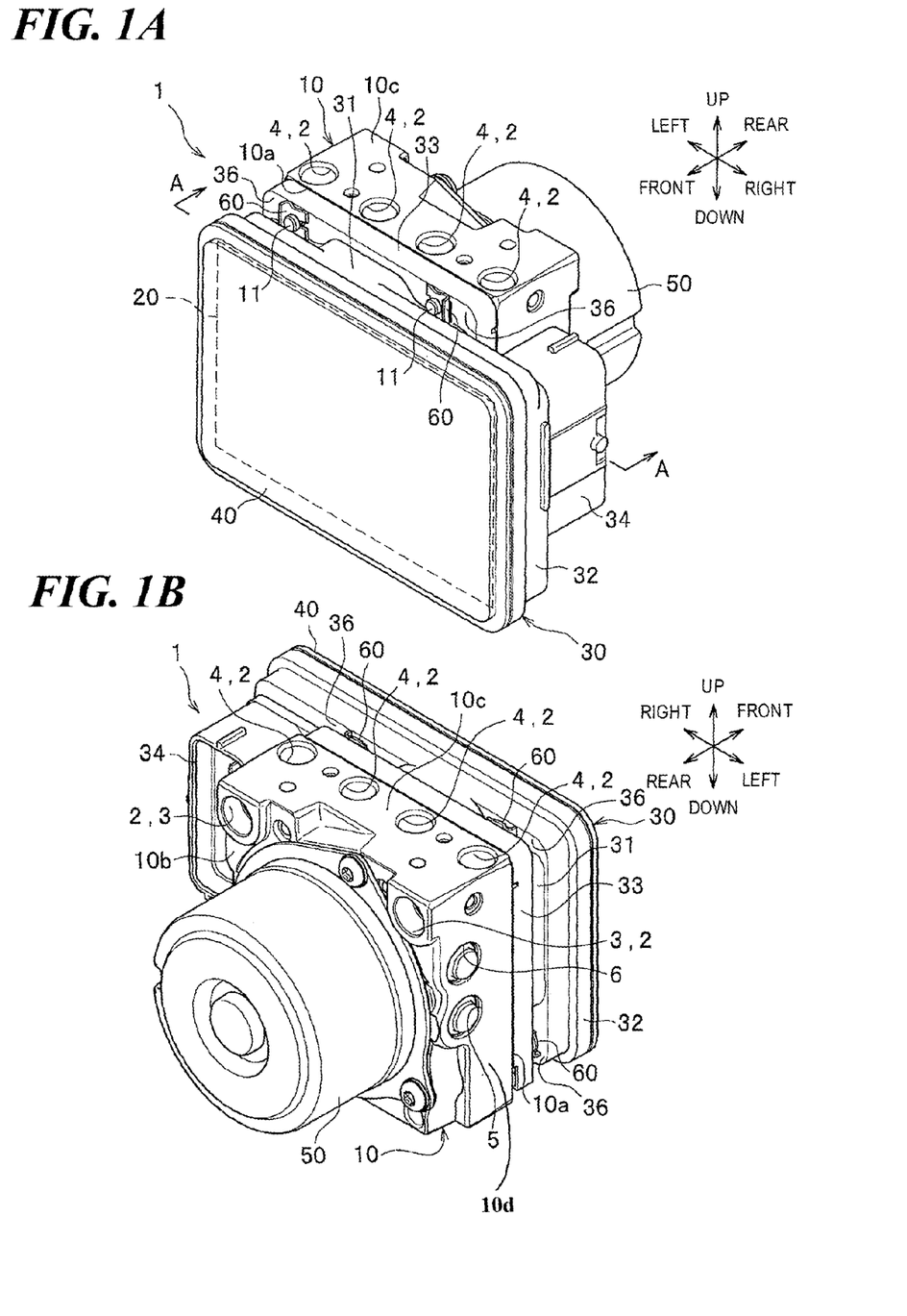
FIG. 1A is a perspective view of the control unit as seen from a rear side.
FIG. 1B is a perspective view of the control unit as seen from a front side.

As shown in FIG. 1A, a vehicle brake hydraulic pressure control unit 1 includes a base body 10, a control circuit board 20 that controls electric parts (not shown), and a housing 30 that is attached to a front surface 10a of the base body 10.

The base body 10 is a metallic part that is formed substantially into a rectangular parallelepiped. Brake fluid lines 2 are formed in an interior of the base body 10. The brake fluid lines 2 are fluid lines for connecting a master cylinder (not shown) and wheel brakes (not shown).

Plural electric parts (not shown) including solenoid valves, pressure sensors and the like are mounted on the front surface 10a.

As shown in FIG. 1B, inlet ports 3, 3 are formed in upper left and right corners on a rear surface 10b of the base body 10. Pipings that reach the master cylinder (not shown) are connected to both the inlet ports 3, 3.

Plural outlet ports 4 are formed in an upper surface 10c of the base body 10. Pipings that reach the wheel brakes (not shown) are connected to the outlet ports 4.

A pump bore 5 is formed in a side surface 10d of the base body 10. A plunger pump is installed in the pump bore 5.

A damper bore 6 is formed above the pump bore 5 in the side surface 10d of the base body 10. A part that makes up a damper for absorbing pulsations of the plunger pump is installed in the damper bore 6.

The holes and bores that are provided in the base body 10 communicate with one another via the brake fluid lines 2.

A motor 50 is fixed to the rear surface 10b of the base body 10. The motor 50 constitutes a drive source for the plunger pump.

As shown in FIG. 1A, the housing 30 is fixed to the front surface 10a in such a state that the housing 30 covers the electric parts (not shown) that project from the front surface 10a of the base body 10. The housing 30 of this embodiment is a box member that is formed from a synthetic resin.

The housing 30 includes a circumferential wall portion 31 that surrounds the electric parts, an accommodating portion 32 that accommodates the control circuit board 20, and a flange 33 that is formed on a circumferential surface of the circumferential wall portion 31.

An open end portion of a rear side (a side facing the base body 10) of the circumferential wall portion 31 is a portion that is butted up against the front surface 10a of the base body 10.

The flange 33 projects along the full circumference of the outer circumferential surface of the circumferential wall portion 31. A rear surface of the flange 33 is a portion that is butted up against an outer circumferential portion of the front surface 10a of the base body 10.

The flange 33 has a substantially square external shape and is formed so as to be substantially the same as an external shape of the front surface 10a of the base body 10.

Figure 3:
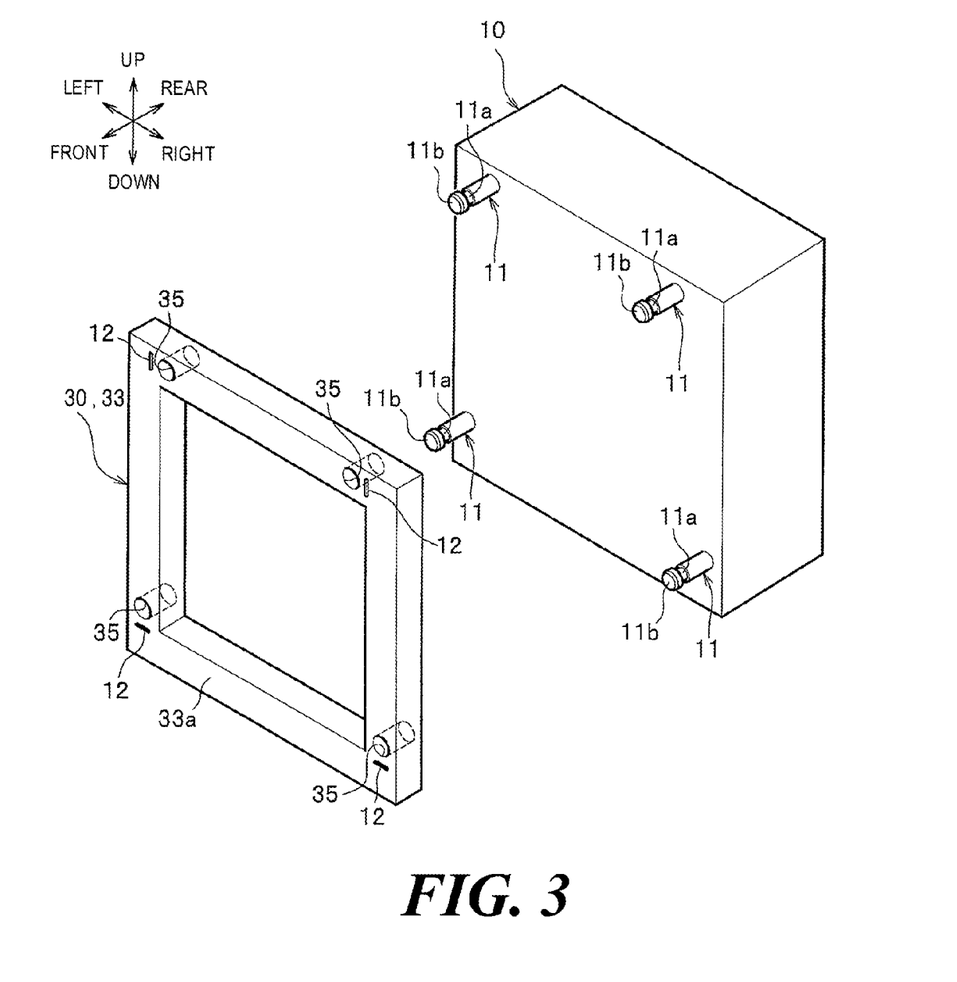
FIG. 3 is a schematic view showing a positional relationship between attaching holes in a flange and attaching pins on a base body in the vehicle brake hydraulic pressure control unit of the embodiment.

As shown in FIG. 3, attaching holes 35 are formed in four corners of the flange 33. FIG. 3 shows only part (only the flange 33) of the housing 30. The attaching holes 35 penetrate the flange 33 and open to a rear surface and a front surface 33a of the flange 33. The attaching holes 35 are portions into which attaching pins 11 of the base body 10, which will be described later, are inserted.

As shown in FIG. 1A, the accommodating portion 32 is formed on a front side (a side opposite to the side facing the base body 10) of the circumferential wall portion 31 and projects further vertically and horizontally than the circumferential wall portion 31. When seen from the front, the accommodating portion 32 is formed into a horizontally extended rectangle.

An interior space of the accommodating portion 32 is a space where the control circuit board 20 is accommodated. A front side of the accommodating portions 32 is opened, and the resulting opening portion is closed by a plate-shaped cover 40.

The accommodating portion 32 projects largely to the right relative to the circumferential wall portion 31, and a connector connecting portion 34 is formed on a rear surface of the projecting portion. The connector connecting portion 34 is a portion to which a connector provided at an end portion of an external wiring cable (not shown) is connected.

As shown in FIGS. 1A and 1B, an outer circumferential portion of the accommodating portion 32 projects into a space defined in front of vertical and horizontal four corners of the flange 33. The outer circumferential portion of the accommodating portion 32 projects to the same position as or outward of an outer circumferential edge portion of the flange 33.

Figure 2:
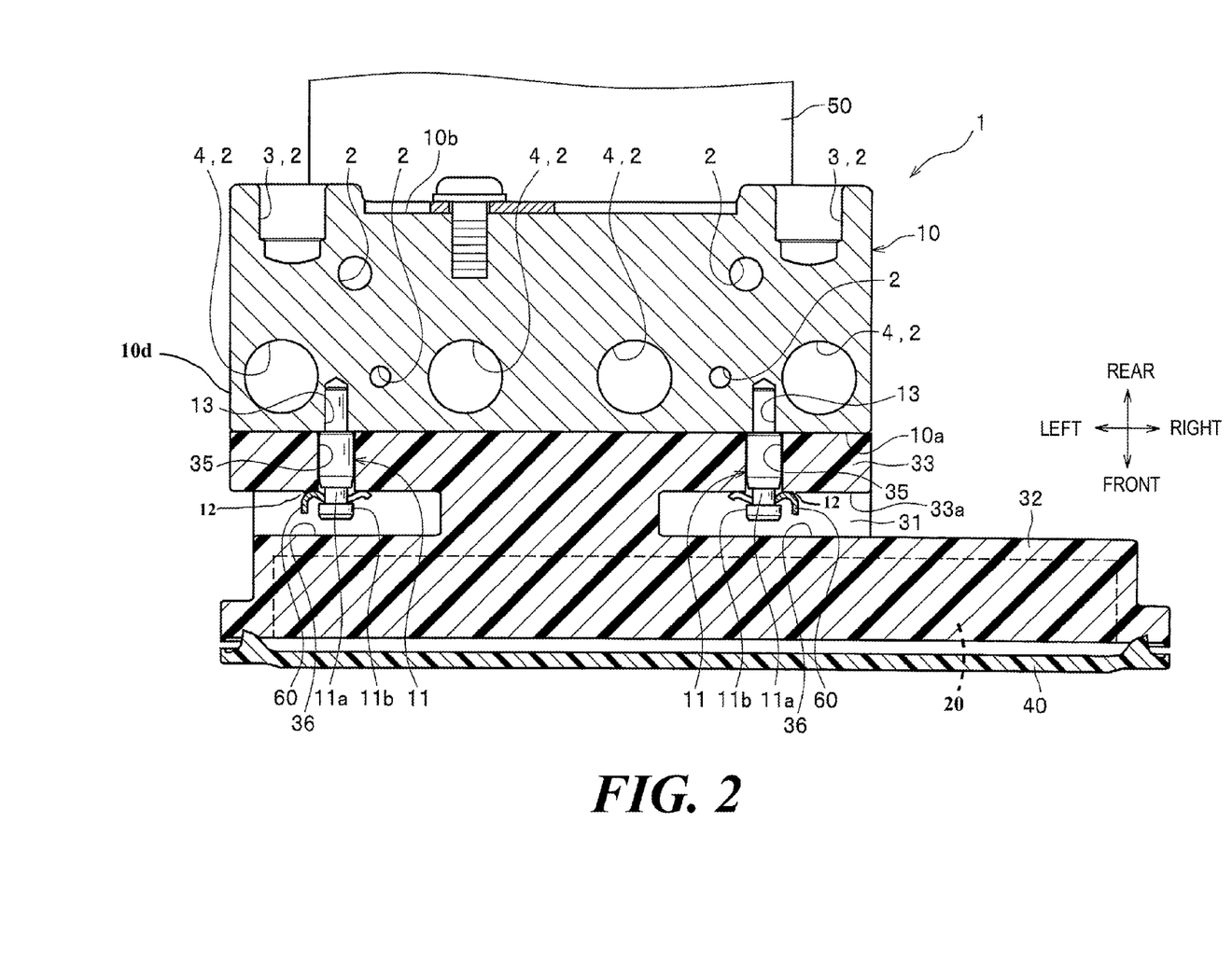
FIG. 2 is a view showing the vehicle brake hydraulic pressure control unit of the embodiment, which is a sectional view taken along a line A-A in FIG. 1A.

The front surface 33a of the flange 33 and the outer circumferential portion of the accommodating portion 32 are disposed so as to be spaced apart from each other in a front-to-rear direction (a height direction of the housing 30)

(refer to FIG. 2). Namely, recess portions 36 are formed in corner portions of the housing 30 in such a manner as to be held by the flange 33 and the outer circumferential portion of the accommodating portion 32.

In the housing 30, the outer circumferential portion of the accommodating portion 32 is positioned on extensions of center axes of the attaching holes 35 in the flange 33, and front opening portions of the attaching holes 35 are covered by the outer circumferential portion of the accommodating portion 32.

Next, an attaching construction of the housing 30 and the base body 10 will be described.

In this embodiment, as shown in FIG. 2, the attaching pins 11 provided on the front surface 10a of the base body 10 so as to project therefrom are inserted into the attaching holes 35 in the flange 33 of the housing 30. Then, the housing 30 is fixed to the front surface 10a of the base body 10 by attaching elastic clips 60 (an "elastic member" in claims) to distal end portions of the attaching pins 11 that project to the front side of the flange 33.

As shown in FIG. 3, the attaching pins 11 are provided at four corners of the front surface 10a of the base body 10 so as to project therefrom. Proximal end portions of the attaching pins 11 are inserted in bottomed holes 13 (refer to FIG. 2) that are formed in the four corners of the front surface 10a of the base body 10.

The attaching holes 35 in the flange 33 of the housing 30 are formed in the positions that correspond to the attaching pins 11 of the base body 10. Consequently, when the flange 33 is butted up against the front surface 10a of the base body 10, the flange 33 is disposed on the front surface 10a so that the attaching pins 11 are inserted into the corresponding attaching holes 35.

In each of the attaching pins 11, a length of a portion that projects from the front surface 10a of the base body 10 is larger than a thickness of the flange 33. Consequently, as shown in FIG. 2, when the flange 33 is butted up against the front surface 10a of the base body 10, the attaching pins 11 penetrate the attaching holes 35 so that the distal end portions of the attaching pins 11 project to the front side of the flange 33. This allows the distal end portions of the attaching pins 11 to be disposed within the recess portions 36 defined between the front surface 33a of the flange 33 and the outer circumferential portion of the accommodating portion 32.

Figure 4:
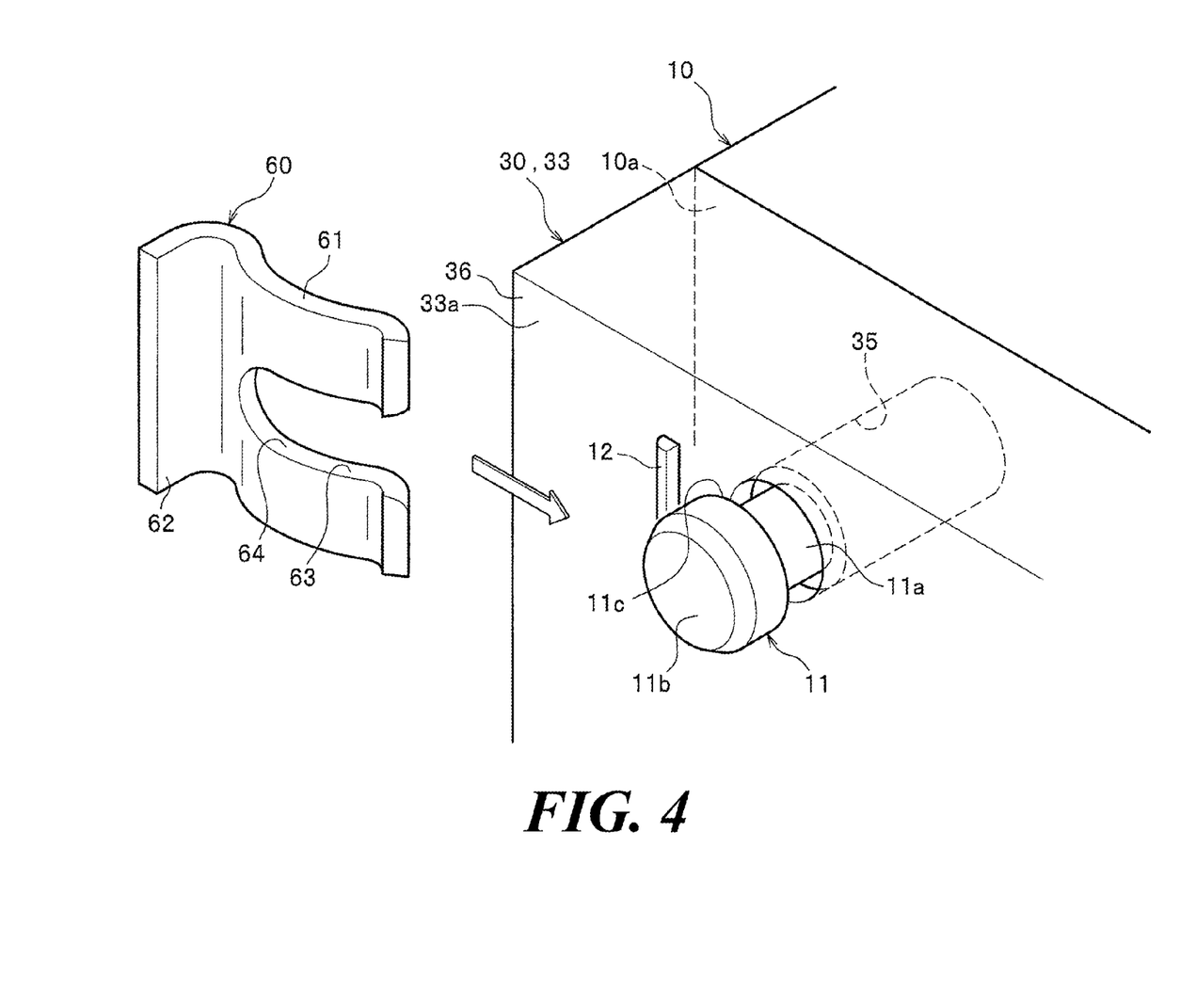
FIG. 4 is a perspective view showing a state resulting before an elastic clip is attached to the attaching pin in the vehicle brake hydraulic pressure control unit of the embodiment.

As shown in FIG. 4, an attaching portion 11a is formed at the distal end portion of the attaching pin 11. A diameter of the attaching portion 11a is smaller than diameters of portions of the attaching pin 11 that lie on both sides of the attaching portion 11a. Thus, the attaching portion 11a forms a groove portion on an outer circumferential surface of the distal end portion of the attaching pin 11 along the full circumference thereof.

Most of the attaching portion 11a is disposed between the front surface 33a of the flange 33 and the outer circumferential portion of the accommodating portion 32, as shown in FIG. 2, when the flange 33 is butted up against the front surface 10a of the base body 10, however, the end portion of the attaching portion 11a that faces the base body 10 is disposed within the attaching hole 35 (refer to FIG. 4).

As shown in FIG. 4, the elastic clip 60 is a bifurcating plate spring that holds the attaching portion 11a of the attaching pin 11 on the front surface 33a of the flange 33.

The elastic clip 60 has a plate-shaped main body portion 61, and a groove portion 63 is formed to be opened toward one edge portion of the main body portion 61. A wall portion 62 is formed at the other edge portion of the main body portion 61 to rise toward the front.

A groove width of the groove portion 63 of the elastic clip 60 is made slightly larger than an outside diameter of the attaching portion 11a of the attaching pin 11.

A circular fitting portion 64 is formed in a bottom portion (an inner end portion) of the groove portion 63. The fitting portion 64 is a portion that is fitted on the attaching portion 11a.

Figure 5:
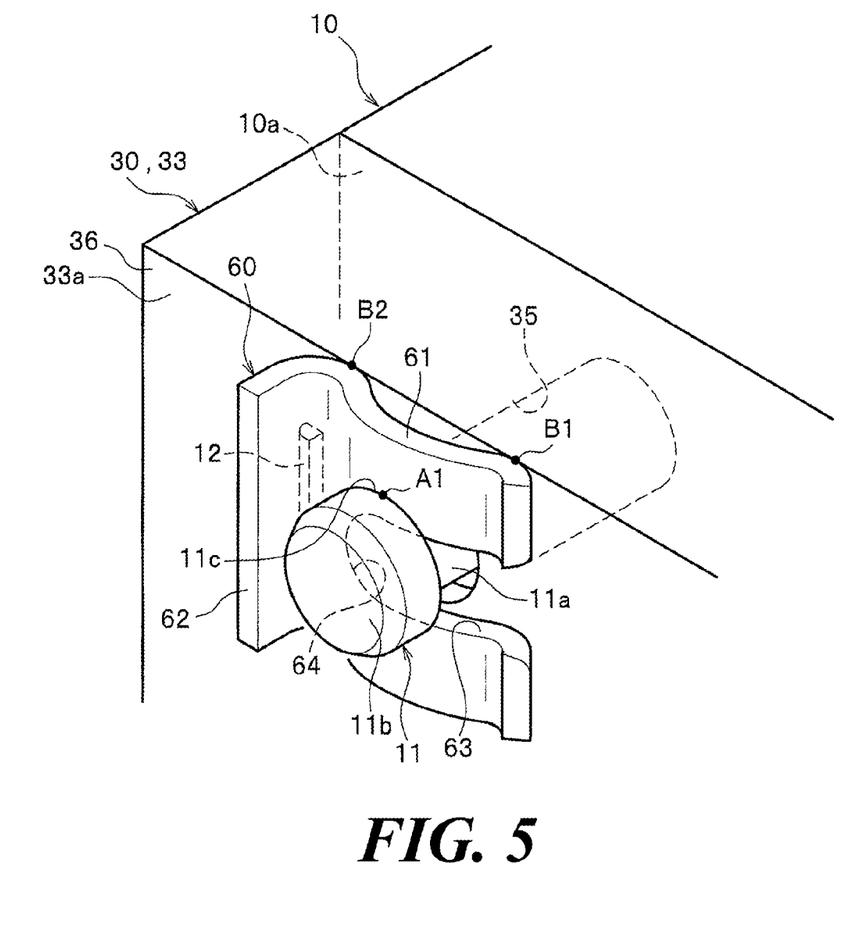
FIG. 5 is a perspective view showing a state resulting after the elastic clip is attached to the attaching pin in the vehicle brake hydraulic pressure control unit of the embodiment.

The main body portion 61 is curved so as to project to the front. When the groove portion 63 of the elastic clip 60 is fitted on the attaching portion 11a of the attaching pin 11 as shown in FIG. 5, the one edge portion and the other edge portion of the main body portion 61 are brought into abutment with the front surface 33a of the flange 33 (at contact points B1, B2 in FIG. 5). An apex portion between the one edge portion and the other edge portion of the main body portion 61 is brought into abutment with a surface 11c, facing the flange 33, of a head portion 11b of the attaching pin 11 (at a contact point A1 in FIG. 5). This allows the main body portion 61 to be elastically engaged between the front surface 33a of the flange portion 33 and the head portion 11b of the attaching pin 11. Then, a pressing force is exerted on the front surface 33a of the flange 33 from the elastic clip 60, whereby the flange 33 is biased toward the front surface 10a of the base body 10.

Projecting portions 12 are formed on the front surface 33a of the flange 33. The projecting portion 12 is brought into abutment with the other edge portion (the edge portion where the wall portion 62 is provided) of the main body portion 61 when the groove portion 63 of the elastic clip 60 is fitted on the attaching portion 11a of the attaching pin 11. The projecting portion 12 is formed in a straight line and functions to prevent the dislocation and rotation of the elastic clip 60.

Next, a procedure will be described of attaching the housing 30 to the base body 10.

Firstly, as shown in FIG. 2, the flange 33 of the housing 30 is butted up against the front surface 10a of the base body 10 while inserting the attaching pins 11 on the base body 10 into the attaching holes 35 in the flange 33.

This causes the attaching portions 11a of the attaching pins 11 to project to the front side of the flange 33, whereby the attaching portions 11a are disposed within the recess portions 36 defined between the front surface 33a of the flange 33 and the circumferential portion of the accommodating portion 32.

Following this, the elastic clips 60 are inserted in the space between the front surface 33a of the flange 33 and the outer circumferential portion of the accommodating portion 32 from sides of the base body 10, and as shown in FIG. 5, the groove portions 63 of the elastic clips 60 are fitted on the attaching portion 11a of the attaching pins 11.

When moving the elastic clip 60 while inserting the attaching portion a of the attaching pin 11 in the groove portion 63 of the elastic clip 60, the elastic clip 60 rides over the projecting portion 12 to move further.

A force is designed to be applied easily to the elastic clip 60 by pushing the wall portion 62 of the main body portion 61.

Then, when the attaching portion 11a of the attaching pin 11 is fitted in the fitting portion 64 of the elastic clip 60 so that the attaching portion 11a is held by the elastic clip 60, the main body portion 61 of the elastic clip 60 is elastically engaged between the front surface 33a of the flange 33 and the head portion 11b of the attaching pin 11.

This allows the elastic clip 60 to bias the flange 33 toward the front surface 10a of the base body 10, whereby the housing 30 is fixed to the front surface 10a of the base body 10.

In the vehicle brake hydraulic pressure control unit 1 that is configured in the way described above, as shown in FIG. 2, the accommodating portion 32 of the housing 30 can also be made to project in the position where the accommodating portion 32 covers the attaching holes 35 in the flange 33. Consequently, as shown in FIG. 1A, since the capacity of the accommodating portion 32 that accommodates the control circuit board 20 can be increased, even though the control circuit board is increased in size as the brakes tend to be controlled in multiple ways, the control circuit board 20 can be accommodated in the housing 30.

The elastic clip 60 is the plate spring and its thickness is thin. Therefore, as shown in FIG. 2, the space between the flange 33 and the accommodating portion 32 can be made small, thereby reducing the housing 30 in size in relation to the height direction.

No through attaching holes need to be provided in the base body 10, and therefore, not only can the base body 10 be reduced in size, but also the housing 30 can be attached to the base body 10 without affecting the brake fluid lines 2, there being no such situation that the base body 10 is increased in size larger than required.

The housing 30 can be attached to or detached from the base body 10 in such a state that the control circuit board 20 is kept attached within the housing. Further, the elastic clips 60 can be attached to or detached from the attaching pins 11 from the sides of the base body 10. Consequently, the fabrication and maintenance of the vehicle brake hydraulic pressure control unit 1 can be facilitated.

Thus, while the embodiment has been described, the invention is not limited thereto but can be altered or modified as required without departing from the spirit and scope of the invention.

In this embodiment, as shown in FIG. 4, the single plate-shaped elastic clip 60 is attached to the attaching pin 11. However, there is no limitation imposed on the configuration of the elastic member that is attached to the attaching pin 11. For example, a plate spring may be used that is formed by bending a single plate into a U-shape to provide two front and rear flat plate portions. A rubber member or a coil spring can also be used as the elastic member.

In this embodiment, the electronic control unit is applied to the vehicle brake hydraulic pressure control unit 1. However, the electronic control unit of the invention can also be applied to various types of control units.

The invention claimed is:

1. An electronic control unit comprising:
   a base body;
   a control circuit board that controls electric parts; and
   a housing that is attached to one surface of the base body,
   wherein the housing includes an accommodating portion which accommodates the control circuit board thereinside and a flange,
   wherein the flange includes an attaching hole penetrating therethrough,
   wherein a part of the accommodating portion is positioned on an extension of a center axis of the attaching hole,
   wherein an attaching pin projects from the one surface of the base body so as to be inserted into the attaching hole,
   wherein an attaching portion is formed on the attaching pin so as to be positioned between the flange and the accommodating portion, and
   wherein an elastic member is attached to the attaching portion so as to bias the flange toward the one surface of the base body.

2. The electronic control unit of claim 1, wherein the elastic member is a bifurcating plate spring formed to hold the attaching portion of the attaching pin.

3. A vehicle brake hydraulic pressure control unit comprising the electronic control unit of claim 1, wherein a brake fluid line is formed in the base body, and wherein a brake hydraulic pressure in the brake fluid line is controlled by the electric parts.

4. The electronic control unit of claim 1, wherein the base body includes a bottomed hole for accommodating the attaching pin which is inserted through the attaching hole of the flange.

5. The electronic control unit of claim 1,
   wherein the housing is attached to a front surface of the base body,
   wherein the housing includes a circumferential wall portion,
   wherein the flange is formed on a circumferential surface of the circumferential wall portion, and
   wherein an open end portion of a rear side facing the base body of the circumferential wall portion is butted up against the front surface of the base body.

6. The electronic control unit of claim 5,
   wherein the flange projects along a full circumference of an outer circumferential surface of the circumferential wall portion,
   wherein a rear surface of the flange is butted up against an outer circumferential portion of the front surface of the base body, and
   wherein the accommodating portion is formed on a side opposite to a side facing the base body of the circumferential wall portion and projects further vertically and horizontally than the circumferential wall portion.

7. The electronic control unit of claim 1,
   wherein an outer circumferential portion of the accommodating portion projects into a space defined in front of corners of the flange,
   wherein the outer circumferential portion of the accommodating portion projects to a same position as or outward of an outer circumferential edge portion of the flange, and
   wherein a front surface of the flange and the outer circumferential portion of the accommodating portion are disposed so as to be spaced apart from each other in a front-to-rear direction to form recess portions.

8. The electronic control unit of claim 7,
   wherein the outer circumferential portion of the accommodating portion is positioned on extensions of the center axes of the attaching holes in the flange, and
   wherein front opening portions of the attaching holes are covered by the outer circumferential portion of the accommodating portion.

9. The electronic control unit of claim 8,
   wherein the flange includes a plurality of attaching holes penetrating therethrough, each of which is formed in respective corners of the flange, and
   wherein a plurality of attaching pins project from a front surface of the base body so as to project therefrom and are inserted into the attaching holes in the flange of the housing.

10. The electronic control unit of claim 9,
wherein the elastic member is provided at distal end portions of the attaching pins that project to a front side of the flange, and
wherein proximal end portions of the attaching pins are inserted in bottomed holes formed in the corners of the front surface of the base body.

11. The electronic control unit of claim 10,
wherein the attaching holes in the flange of the housing are formed in positions that correspond to the attaching pins of the base body such that when the flange is butted up against the front surface of the base body, the flange is disposed on the front surface so that the attaching pins are inserted into the corresponding attaching holes.

12. The electronic control unit of claim 11,
wherein in each of the attaching pins, a length of a portion that projects from the front surface of the base body is larger than a thickness of the flange such that when the flange is butted up against the front surface of the base body, the attaching pins penetrate the attaching holes so that the distal end portions of the attaching pins project to the front side of the flange allowing the distal end portions of the attaching pins to be disposed within the recess portions defined between the front surface of the flange and the outer circumferential portion of the accommodating portion.

13. The electronic control unit of claim 12,
wherein each of the attaching pins include an attaching portion which is formed at a distal end portion of the attaching pin, and
wherein the attaching portions are a groove portion on an outer circumferential surface of the distal end portion of the attaching pins along a full circumference thereof.

14. The electronic control unit of claim 13,
wherein the attaching portions are disposed between the front surface of the flange and the outer circumferential portion of the accommodating portion, and
wherein the end portion of the attaching portions that faces the base body is disposed within the attaching holes.

15. The electronic control unit of claim 1,
wherein the elastic member has a plate-shaped main body portion, and a groove portion formed to be opened toward one edge portion of the main body portion, and
wherein a wall portion is formed at another edge portion of the main body portion.

16. The electronic control unit of claim 15,
wherein a groove width of the groove portion is larger than an outside diameter of the attaching portion of the attaching pin.

17. The electronic control unit of claim 16, further comprising a circular fitting portion formed in an inner end portion of the groove portion,
wherein the fitting portion is fitted on the attaching portion.

18. The electronic control unit of claim 17,
wherein the main body portion is curved so as to project outwards,
wherein when the groove portion of the elastic member is fitted on the attaching portion of the attaching pin, the one edge portion and the other edge portion of the main body portion are brought into abutment with a front surface of the flange at contact points B1, B2.

19. The electronic control unit of claim 18,
wherein an apex portion between the one edge portion and the other edge portion of the main body portion is brought into abutment with a surface, facing the flange, of a head portion of the attaching pin at a contact point.

20. The electronic control unit of claim 19,
wherein projecting portions are formed on the front surface of the flange, and
wherein the projecting portion is brought into abutment with an edge portion where the wall portion is provided of the main body portion when the groove portion of the elastic member is fitted on the attaching portion of the attaching pin, and
wherein the projecting portion is formed in a straight line and functions to prevent dislocation and rotation of the elastic member.

* * * * *